Figure 1:
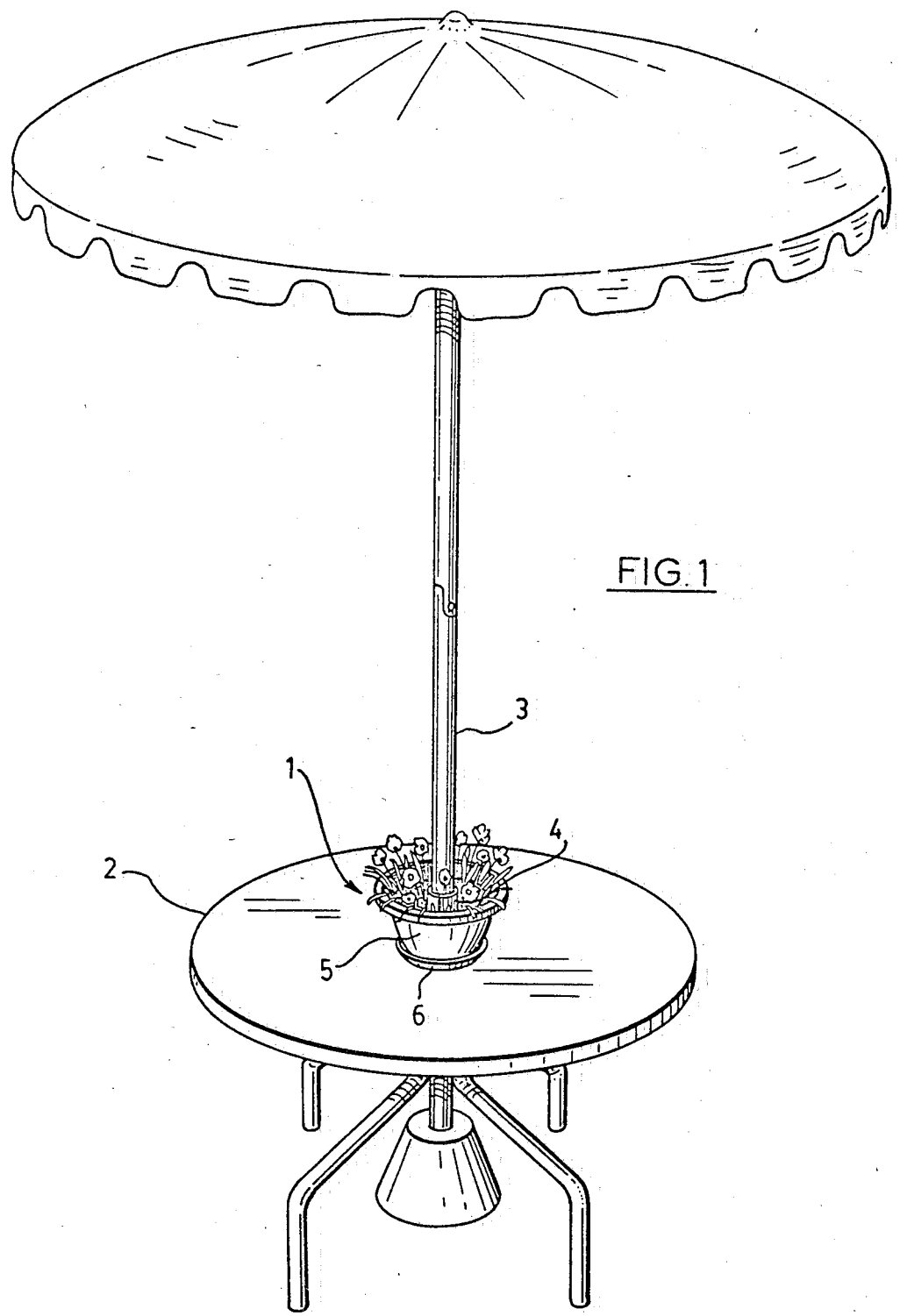

United States Patent [19]

Adair et al.

[11] Patent Number: 4,597,221

[45] Date of Patent: Jul. 1, 1986

[54] PLANT RECEPTACLE

[75] Inventors: Brenda A. Adair; Kent A. Stevens, both of Ontario, Canada

[73] Assignee: Creative Planters Inc., Port Hope, Canada

[21] Appl. No.: 593,056

[22] Filed: Mar. 26, 1984

[51] Int. Cl.⁴ .............................................. A01G 9/02
[52] U.S. Cl. ......................................... 47/66; 47/71; 47/67
[58] Field of Search ................. 135/16; 47/66, 67, 71, 47/39, 70, 82, 83, 41

[56] References Cited

U.S. PATENT DOCUMENTS

| 52,200 | 1/1866 | Prince | 47/67 |
|---|---|---|---|
| 3,381,410 | 2/1966 | Potain | 47/71 |
| 3,444,799 | 5/1961 | Covington | 135/16 |
| 4,047,329 | 9/1977 | Holt | 47/71 |
| 4,092,804 | 6/1978 | Morris et al. | 47/71 |
| 4,161,844 | 7/1979 | Hentschel et al. | 47/66 |
| 4,227,343 | 10/1980 | Espy et al. | 47/67 |

FOREIGN PATENT DOCUMENTS 471172  4/1914  France .................................... 47/71

Primary Examiner—Robert A. Hafer
Assistant Examiner—Bradley M. Lewis
Attorney, Agent, or Firm—Rogers, Bereskin & Parr

[57] ABSTRACT

A plant receptacle for use with an umbrella-type table having a generally horizontal table top and an umbrella mounted to an umbrella supporting member extending generally vertically through an aperture located in said table top is disclosed. The receptacle comprises a first, outer container, a second, inner container and a central sleeve. The first container is generally saucer shaped and has a side wall and a bottom wall. The bottom wall of the first container has a central aperture dimensioned to permit the umbrella supporting member to extend through such aperture. The sleeve extends upwardly from the bottom wall of the first container and is open at both ends and is internally dimensioned to permit the umbrella supporting member to extend through such sleeve. The second container is adapted to be positioned upon and within the first container and is generally bowl shaped and has a side wall and a bottom wall. The bottom wall of the second container has a central aperture dimensioned to permit the sleeve to extend through such aperture. The first and second containers and the sleeve are positioned concentrically, with the second container and the sleeve defining an upwardly facing annular cavity of sufficient volume for locating earth and implanting flowers and the like.

8 Claims, 2 Drawing Figures

PLANT RECEPTACLE

This invention relates generally to a plant receptacle designed to be used in combination with an umbrella-type table.

In recent years, umbrella-type tables have become very popular for use in private gardens and on private patios, as well as at restaurants, cafes, golf and tennis clubs, hotels, and the like. Essentially, such tables are comprised of a table top and legs to support the table top in a generally horizontal orientation and an umbrella mounted on a supporting member which extends in a generally vertical orientation through an aperture located in the table top. Typically, the table top of such a table is of generally circular horizontal section and the aperture through which the umbrella supporting member extends is located in the center of the table top. Typically, this aperture and the umbrella supporting member are of circular horizontal section and the umbrella supporting member is comprised of an upper portion on which the umbrella is mounted and a lower portion which is either affixed to a subterranean anchor or affixed to a weighted pedestal. Typically, the upper and lower portions of the umbrella supporting member are tubular sections which demountably couple together above the table top.

Conventional plant receptacles cannot be positioned centrally on the table top of such tables because the umbrella supporting member extends through the central aperture. A conventional plant receptacle can be positioned only in the peripheral area of the table top, eccentric to the umbrella supporting member. Such positioning has the disadvantage that the plant receptacle would occupy useful working area of the table top. Since umbrella-type tables are typically of a relatively small size, it is highly desirable to be able to locate a plant receptacle in the central part of the table top to minimize obstruction of the limited working area of the periphery. Furthermore, a conventional plant receptacle can not be secured to the table top and is therefore, susceptible to accidential tipping over or toppling off the table when acted upon by a force such as wind or when an individual unintentionally bumps into the table. It would also be susceptible to unauthorized removal.

The plant receptacle of this invention may be positioned concentric to and surrounding the umbrella supporting member, resulting in a pleasing aesthetic appearance and leaving the peripheral working area of the table top essentially unobstructed. In addition, the plant receptable of this invention is securely engaged in a stable placement so that it cannot be readily tipped over or knocked off the table or readily removed by an unauthorized person. The plant receptacle of this invention also comprises desirable features of conventional plant receptacles such as providing a cavity of adequate volume to hold earth and plants and also providing good drainage.

U.S. patent literature discloses several examples of plant receptacles of specialized designs. For example, U.S. Pat. No. 3,084,666, which issued Apr. 9, 1963 to Louis M. Plaisance, entitled Combination Bird Bath and Plant Receptacle Support, discloses a design for a plant receptacle resting on the upper end of a tubular pedestal and located in the center of an annular water trough in which birds may bathe. Also, U.S. Pat. No. 585,486, which issued June 29, 1897, to Mariah A. Snow, entitled Combined Vase and Flag Holder, discloses a plant receptacle concentrically mounted on a flag pole.

Other examples of prior art plant receptacles which were considered during the preparation of this application are disclosed in the following U.S. patents:

U.S. Pat. No. 2,876,587, which issued Mar. 10, 1959, to Candlestick Flower Arranger, Inc.;

U.S. Pat. No. 3,879,889, which issued Apr. 29, 1975, to Willi Schmid;

U.S. Pat. No. 1,487,231, which issued Mar. 18, 1924, to Rady George.

It is an object of this invention to provide an improved plant receptacle designed for use in combination with an umbrella-type table. In accordance with this invention, such a plant receptacle comprises a first, outer container, a second inner container and a central sleeve. The first container is generally saucer shaped and has a side wall and a bottom wall. The bottom wall of the first container has central aperture dimensioned to permit the umbrella supporting member to extend through such aperture. The sleeve extends upwardly from the bottom wall of the first container and is open at both ends and is internally dimensioned to permit the umbrella supporting member of an umbrella-type table to extend through such sleeve. The second container is adapted to be positioned upon and within the first container and is generally bowl shaped and has a side wall and a bottom wall. The bottom wall of the second container has a central aperture dimensioned to permit the sleeve to extend through such aperture. The first and second containers and the sleeve are positioned concentrically, with the second container and the sleeve defining an upwardly facing annular cavity of sufficient volume for locating earth and implanting flowers and the like.

In order that the invention may be more clearly understood, reference will now be made to the accompanying drawings which illustrate a preferred embodiment of the invention by way of example.

Figure 2:
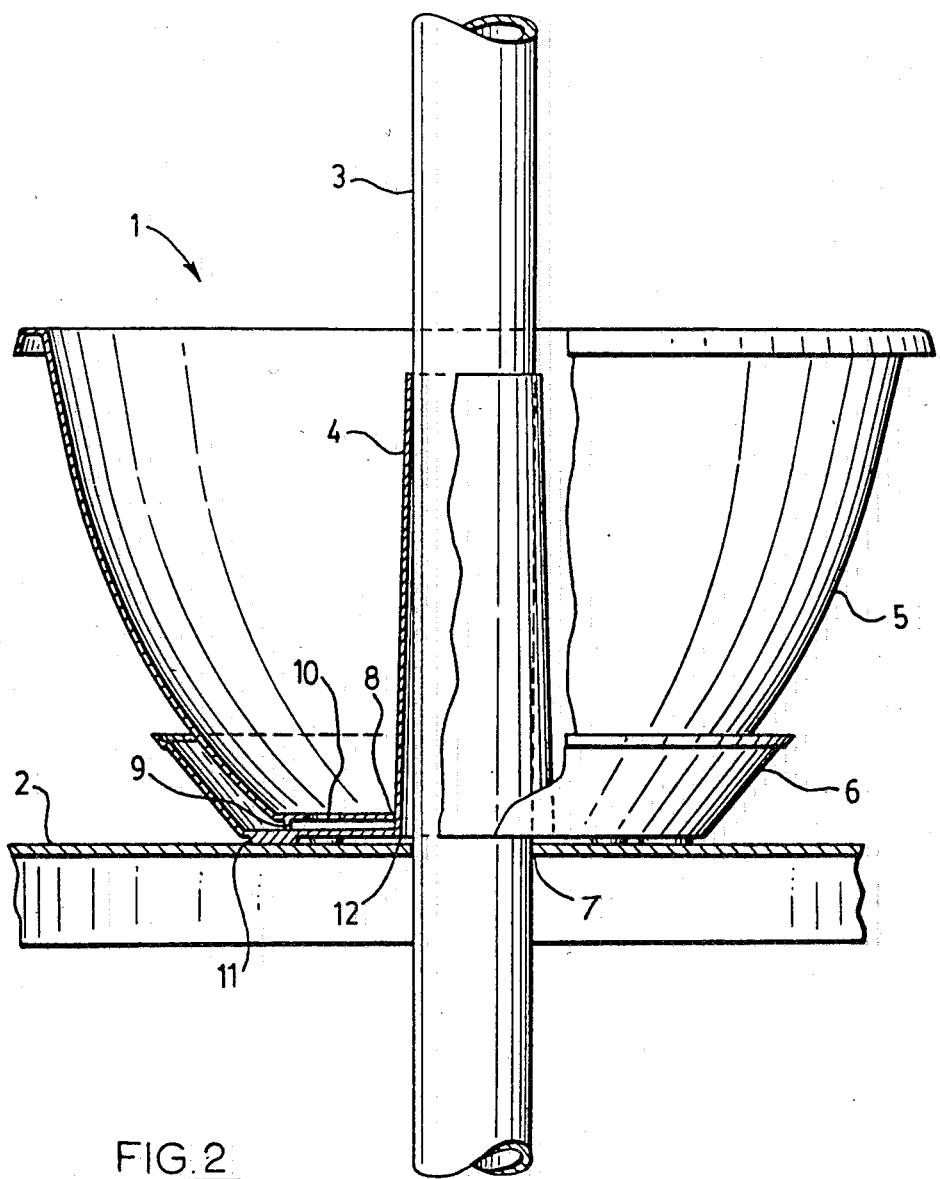

FIG. 1 is a perspective of the plant receptacle according to a preferred embodiment of the invention, the plant receptacle being shown in use with an umbrella-type patio table. FIG. 2 is a side view of a portion of FIG. 1, partly in section.

The plant receptacle, which is denoted by reference numeral 1 in the drawings, essentially comprises a first inner bowl shaped container 5, a second outer saucer shaped container 6 and a sleeve 4, which are all concentrically attached. In this particular embodiment, the outer saucer shaped container and the sleeve are a unitary moulding and the sleeve extends upwardly from the bottom wall of the outer saucer shaped container through an aperture in the inner bowl shaped container. The inner bowl shaped container rests upon the outer saucer shaped container and the outer saucer shaped container rests upon the table top 2. The table top may be supported in a generally horizontal orientation by table legs. Umbrella supporting member 3 extends through an aperture in the table top and through the sleeve of the plant receptacle. The umbrella supporting member may be held in a generally vertical orientation by a weighted pedestal or by a subterranean anchor and may comprise an upper portion on which the umbrella is fixed and a lower portion, which upper and lower portions couple together above the table top.

The outer saucer shaped container and sleeve extension comprise a first unitary plastic moulding and the inner bowl shaped container comprises a second unitary plastic moulding, which first and second unitary plastic mouldings may be secured together in the configuration shown in the drawing. In an alternative embodiment, it might be possible to mould the inner bowl shaped container and the sleeve as a first unitary plastic moulding and the outer saucer shaped container as a second unitary plastic moulding. Alternatively, it might be possible to mould the plant receptacle in one piece.

Referring now to the drawings in somewhat more detail, the inner bowl shaped container and the outer saucer shaped container are dimensioned so that the inner bowl shaped container may be positioned upon and inside the outer saucer shaped container. The overall height and diameter of the plant receptacle may be of any size suitable for use on an umbrella-type table. The sleeve, which is opened at both ends, is internally dimensioned to permit the umbrella supporting member to be disposed within the sleeve. The umbrella supporting members for commercially available umbrella-type tables are generally tubular sections of standard diameters not exceeding 1⅜ inches. Whether the sleeve of the plant receptacle engages the umbrella supporting member is not significant and therefore, it will be possible to manufacture a plant receptacle with a standard size sleeve which will fit the umbrella supporting member of any standard, commercially available umbrella-type table.

In the embodiment shown in the drawings, the outer saucer shaped container has a side wall and a bottom wall. The bottom wall has a central aperture 12 dimensioned to permit the umbrella supporting member to extend through such aperture. The bottom wall also has a number of feet or ridges 11 which extend downwardly so that when the plant receptacle is positioned upon the table, the bottom wall of the outer saucer shaped container engages the table top only at the feet, thus providing a cavity between the bottom wall and the table top for adequate ventilation.

The sleeve extends upwardly from the bottom wall of the outer saucer shaped container through an aperture in the bottom wall of the inner bowl shaped container. The sleeve is of sufficient height so that an upwardly facing annular cavity of sufficient volume to locate earth and plants is defined by the sleeve and the inner bowl shaped container.

The inner bowl shaped container has a side wall and a bottom wall. The bottom wall has a centrally located aperture 8 which may be dimensioned so that the interior edge of the aperture is in engagement with the sleeve and so that the outer saucer shaped container and the sleeve are frictionally retained in engagement with the inner bowl shaped container. The bottom wall of the inner bowl shaped container may have a plurality of drainage orifices 10 and may also have a plurality of ridges or feet 9 which extend downwardly from the bottom wall of the inner bowl shaped container and which are dimensioned so that they rest upon the bottom wall of the outer saucer shaped container providing a cavity between the bottom walls of the two containers for adequate drainage.

The side walls of both the inner bowl shaped container and the outer saucer shaped container may be of generally cylindrical but downwardly tapering arcuate shape and may also have lips at the upper ridges. The internal sleeve may be of generally cylindrical but upwardly tapering shape.

The umbrella supporting members of typical umbrella-type tables, as indicated previously, generally comprise upper and lower portions which couple together above the table top. The plant receptacle of the present invention is primarily designed to be positioned on an umbrella-type table by disengaging the upper portion of the umbrella supporting member and then directing the plant receptacle downwardly onto the center of the table top, so that the sleeve of the plant receptacle slides over the lower portion of the umbrella supporting member, and subsequently reengaging the upper portion of the umbrella supporting member.

It will of course be appreciated that the preceeding description relates to a preferred embodiment of the invention only and that many modifications are possible within the broad scope of the invention. The shapes of the containers and the sleeve and the method of their concentric attachment can vary, depending on the preferred manufacturing technique.

We claim:

1. A plant receptacle for use with an umbrella-type table having a generally horizontal table top and an umbrella mounted to an umbrella supporting member extending generally vertically through an aperture located in said table top, the receptacle comprising a first, outer container, a second, inner container and a central sleeve, said first container being generally saucer shaped and having a side wall and a bottom wall, the bottom wall of said first container having central aperture dimensioned to permit said umbrella supporting member to extend through said aperture, said sleeve extending upwardly from and being contiguous to the bottom wall of said first container, so that water and soil do not leak out of said receptacle between said sleeve and said first container, and said sleeve also being open at both ends and being internally dimensioned to permit said umbrella supporting member to extend through said sleeve, and said second container being adapted to be positioned upon and within said first container and being generally bowl shaped and having a side wall and a bottom wall, the bottom wall of said second container having a central aperture dimensioned to permit said sleeve to extend through said aperture, said second container also having drainage means so that said plant receptacle permits drainage of water from said second container to said first container but prevents leakage of water or soil through said central aperture in the bottom wall of said first container, said sleeve being of height proximate that of the side wall of said second container so that when said first and second containers and said sleeve are positioned concentrically, said second container and said sleeve define an upwardly facing annular cavity of sufficient volume for locating earth and implanting flowers and the like.

2. A plant receptacle as claimed in claim 1, wherein said first container and said sleeve comprise a first unitary moulding in a suitable plastic material and said second container comprises a second unitary moulding in a suitable plastic material.

3. A plant receptacle as claimed in claim 1, wherein said aperture of said bottom wall of said second container is dimensioned so that the peripheral edge of said sleeve is in engagement with and frictionally retained by the interior edge of said aperture.

4. A plant receptacle as claimed in claim 1, wherein said bottom wall of said first container has a plurality of ridges extending downwardly from said bottom wall.

5. A plant receptacle as claimed in claim 1, wherein said bottom wall of said second container has a number of drainage orifices eccentric to said aperture of said bottom wall.

6. A plant receptacle as claimed in claim 1, wherein said bottom wall of said second container has a plurality of ridges extending downwardly from said bottom wall and resting upon said bottom wall of said first container.

7. A plant receptacle as claimed in claim 1, wherein said side walls of said first and second containers are of generally cylindrical but downwardly tapering arcuate shape and wherein said sleeve is of generally cylindrical but upwardly tapering shape.

8. A plant receptacle, comprising first and second unitary plastic mouldings, said first moulding being shaped generally like a saucer with a sleeve extending upwardly therefrom, said saucer having a central aperture in its bottom wall internally dimensioned to accommodate an umbrella supporting member of an umbrella-type table, said sleeve extending upwardly from the rim of said saucer aperture, being open at both ends and being internally dimensioned to accommodate an umbrella supporting member of an umbrella-type table, said second moulding being shaped generally like a bowl, said bowl having a central aperture in its bottom wall, internally dimensioned to accommodate said sleeve, and also having a number of drainage orifices, said bowl being positioned concentrically upon and within said saucer with said sleeve extending upwardly through, and being frictionally retained by said bowl aperture, the bottom walls of said bowl and said saucer being separated by a plurality of ridges extending between them, thereby defining a generally annular drainage cavity, said sleeve being of height proximate that of the side wall of said bowl, and said sleeve and said bowl defining an upwardly facing annular cavity of sufficient volume for locating earth and implanting flowers.

* * * * *